United States Patent [19]

Robbins

[11] Patent Number: 5,005,726

[45] Date of Patent: Apr. 9, 1991

[54] COMPOSITE CONTAINER ASSEMBLIES

[76] Inventor: Edward S. Robbins, 459 N. Ct., Florence, Ala. 35630

[21] Appl. No.: 431,760

[22] Filed: Nov. 6, 1989

Related U.S. Application Data

[63] Continuation-in-part of Ser. No. 288,237, Dec. 22, 1988, Pat. No. 4,930,644, and a continuation-in-part of Ser. No. 332,994, Apr. 4, 1989, abandoned, and a continuation-in-part of Ser. No. 379,783, Jul. 14, 1989, abandoned.

[51] Int. Cl.$^5$ .............................................. B65B 3/00
[52] U.S. Cl. ..................................... 220/403; 220/404
[58] Field of Search ...................... 220/414, 410, 403

[56] References Cited

U.S. PATENT DOCUMENTS

| | | | |
|---|---|---|---|
| 2,338,604 | 1/1944 | Silveyra | 220/404 |
| 2,757,669 | 8/1956 | Gewzcke et al. | 220/404 |
| 3,039,648 | 6/1962 | Busch | 220/404 |
| 3,179,323 | 4/1965 | Miller | 220/462 |
| 3,285,461 | 11/1966 | Santelli | 220/404 |
| 3,447,260 | 6/1969 | Abelius | 220/404 |
| 3,567,104 | 3/1971 | Arslanian | 220/404 |
| 4,122,973 | 10/1978 | Ahern | 220/404 |
| 4,174,051 | 11/1979 | Edwards et al. | 222/105 |
| 4,321,922 | 5/1982 | Deaton | 220/404 |
| 4,459,793 | 7/1984 | Zenger | 220/404 |
| 4,611,350 | 9/1986 | Kaczerlaski | 220/404 |
| 4,694,972 | 9/1987 | Bimonte et al. | 220/404 |
| 4,874,107 | 10/1989 | Arnau-Munoz et al. | 220/404 |

Primary Examiner—Joseph M. Moy
Attorney, Agent, or Firm—Nixon & Vanderhye

[57] ABSTRACT

A composite container includes an outer metal or plastic container body having relatively rigid side, bottom and top walls, with the top wall having a centrally located aperture for insertion and removal of an inner container in the form of a thin, flexible liner or bladder. The inner liner or bladder includes a relatively thin peripheral side wall and bottom wall, and a relatively thicker upper portion including an integrally formed pour spout. The side wall and bottom wall of the outer container body provide substantially full surface support for the side and bottom walls of the inner liner. The pour spout is provided with a peripheral groove which may be snap fit within the aperture formed in the outer container after the major portion of the liner or bladder has been collapsed and inserted into the outer container through the aperture. The pour spout itself has a thin peripheral upper portion which allows the spout to be collapsed to an inoperative position, with the major portion of the spout being located beneath the top wall of the outer container, to facilitate shipment and vertical stacking. Suitable closures may be provided for closing the otherwise open upper end of the pouring spout.

38 Claims, 5 Drawing Sheets

COMPOSITE CONTAINER ASSEMBLIES

CROSS-REFERENCE TO RELATED APPLICATIONS

This application is a continuation-in-part of commonly owned and copending U.S. patent application Ser. No. 07/288,237 filed on Dec.22, 1988, and entitled "Thin Film Container with Removable Lid Related Process", now U.S. Pat. No. 4,930,644; Ser. No. 07/332,994 filed on Apr. 4, 1989 and entitled "Containers Having Upper and Lower Sections of Different Thicknesses and Extrusion Blow-Molding Methods to Form the Same", now abandoned; and Ser. No. 07/379,783 filed July 14, 1989 and entitled "Containers with Thin Film Integral Lining", now abandoned. This application is also related to commonly owned, and copending U.S. patent application Ser. No. 07/372,760 filed on June 29, 1989, and entitled "Sleeved Containers with Thin Film Lining", and Ser. No. 07/372,761 filed on June 29, 1989, and entitled "Containers Having One or More Integral Bands of Increased Thickness", now U.S. Pat. No. 4,979,628, the entire content of each of these prior-filed U.S. Applications being expressly incorporated herein by reference.

FIELD OF THE INVENTION

This invention generally relates to containers for holding various liquid materials, for example milk, water and particularly viscous liquids such as syrup. More specifically, the present invention relates to composite containers having relatively rigid outer container bodies, and relatively thin inner containers provided with integral pouring necks or spouts, the inner containers being detachably securable to the outer container bodies.

BACKGROUND AND SUMMARY OF THE INVENTION

In my earlier issued U.S. Pat. No. 4,805,799, novel containers are disclosed which include a substantially rigid upper container segment, a flexible bladder integral with, and depending from, the upper container segment, and a lower substantially rigid container segment attached to the upper container segment so that the flexible bladder is housed therewithin. While the containers disclosed in that patent are usable in many end-use applications, certain specialized end-use applications demand equally specialized containers.

The containers of the present invention represent improvements over the container disclosed in my earlier U.S. Pat. No. 4,805,799 and in my earlier filed parent and related applications, and are therefore particularly well suited for use in additional special end-use applications as described further herein.

For example, in the packaging of foodstuffs and particularly relatively thick or viscous liquid foodstuffs typically shipped in large volume, e.g., five gallon containers, there is a need for strong yet economical leak-proof containers which are capable of standing up to the rigors of shipping, stacking, handling, storage, etc. By means of the present invention, container assemblies are provided which meet or exceed these requirements.

In one exemplary embodiment of the present invention, a composite container includes an outer metal or plastic container body having relatively rigid side, bottom and top walls, with the top wall having a centrally located aperture for insertion and removal of an inner container in the form of a thin, flexible liner or bladder. In this exemplary embodiment, the inner liner or bladder includes a relatively thin peripheral side wall and bottom wall, and a relatively thicker upper portion including a top wall formed with an integral pour spout. The side wall and bottom wall of the outer container body provide substantially full surface support for the side and top walls of the inner liner (in all embodiments). The pour spout is provided with a peripheral groove which may be snap fit within the aperture formed in the outer container after the major portion of the liner or bladder has been collapsed and inserted into the outer container through the aperture. The pour spout itself has a thin peripheral upper portion which allows the spout to be collapsed to an inoperative or retracted position, with the major portion of the spout being located beneath the top wall of the outer container to facilitate shipment and vertical stacking. Suitable closures may be provided for closing the otherwise open upper end of the pouring spout.

Also in this exemplary embodiment, venting apertures may be provided in the top wall of the outer container body to allow the interior thereof to be subject to atmospheric pressure which facilitates pouring of liquid contents from within the flexible and collapsible bladder or liner.

It is another feature of this first exemplary embodiment of the invention that vertically (i.e., axially) extending, integrally formed ribs or grooves may be provided on the peripheral side wall of the inner bladder or liner, not only to provide some degree of rigidity to the liner, but also to provide a flow path for air along the peripheral side wall of the bladder to facilitate removal of the liner from the outer container body. By adding some rigidity in the axial direction, the liner is prevented from collapsing during pouring.

In a second exemplary embodiment of the invention, the outer container may comprise a relatively rigid plastic or metal drum body having an upper open end provided with an annular bead about its upper edge. An inner container in the form of a bladder or liner, having a relatively thin collapsible side wall, a bottom wall and a relatively rigid top wall including a pouring spout and a vent spout, may be supported on the annular bead of the outer drum by means of an integral flexible flange provided about the upper end of the liner or bladder. This flexible flange may be fitted over the annular bead of the rigid outer container and secured thereto by a retaining ring which pinches the liner flange securely against the annular bead.

In a third exemplary embodiment of the present invention, an inner container in the form of a liner or bladder may be supported within a relatively rigid outer container wherein substantially all of the top wall and spout arrangement of the inner liner or bladder is exposed, but mounted within a recessed area of the top wall of the outer container. As a result, an enlarged peripheral portion of the outer container is vertically spaced relative to the interior liner or bladder to thereby provide a shock-absorber like chamber which facilitates nesting of a plurality of the containers while at the same time protecting the inner liner or bladder.

In a fourth exemplary embodiment, a flexible inner container in the form of a liner or bladder is supported within a relatively rigid outer container, and the inner liner is formed with a relatively rigid upper portion including a pouring spout, the upper portion extending above the peripheral side wall of the relatively rigid outer container. A relatively rigid cover may then be applied, (preferably snap fit) over the upper portion of the flexible liner and detachably secured thereto.

In a fifth exemplary embodiment, there is described a composite container including a flexible inner container in the form of a liner or bladder detachably secured to a relatively rigid outer container body in much the same manner as in the first described embodiment but wherein the pouring spout is not movable or collapsible between operative and inoperative positions.

In a sixth exemplary embodiment, a collapsible inner container o liner is detachably securable within a relatively rigid outer container including a top wall and a recessed aperture. The recessed aperture allows the inner liner or bladder pour spout to be located below a peripheral top wall bead to facilitate vertical stacking without requiring a collapsibility feature for the liner spout.

In its broadest aspect, the present invention provides a container assembly comprising a relatively rigid outer container body having a first peripheral side wall and a first bottom wall; a relatively thin, flexible and collapsible container body having a second peripheral sidewall, a second bottom wall and a top wall, the top wall having an integral dispensing portion formed therein, wherein the inner container is nested within the outer container so that substantially all of the second peripheral side and bottom walls are in engagement with an supported by the outer container, and wherein the inner container is releasably securable within the outer container.

Additional objects and advantages of the variously described exemplary embodiments of the invention will become apparent after careful consideration of the detailed description which follows.

DETAILED DESCRIPTION OF THE DRAWINGS

Figure 1:
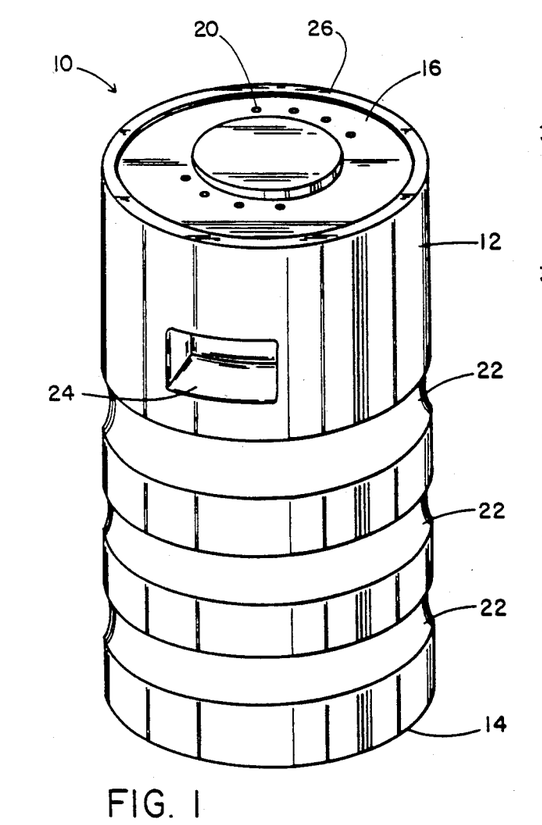
FIG. 1 is a perspective view of a composite container in accordance With the present invention.
Figure 2:
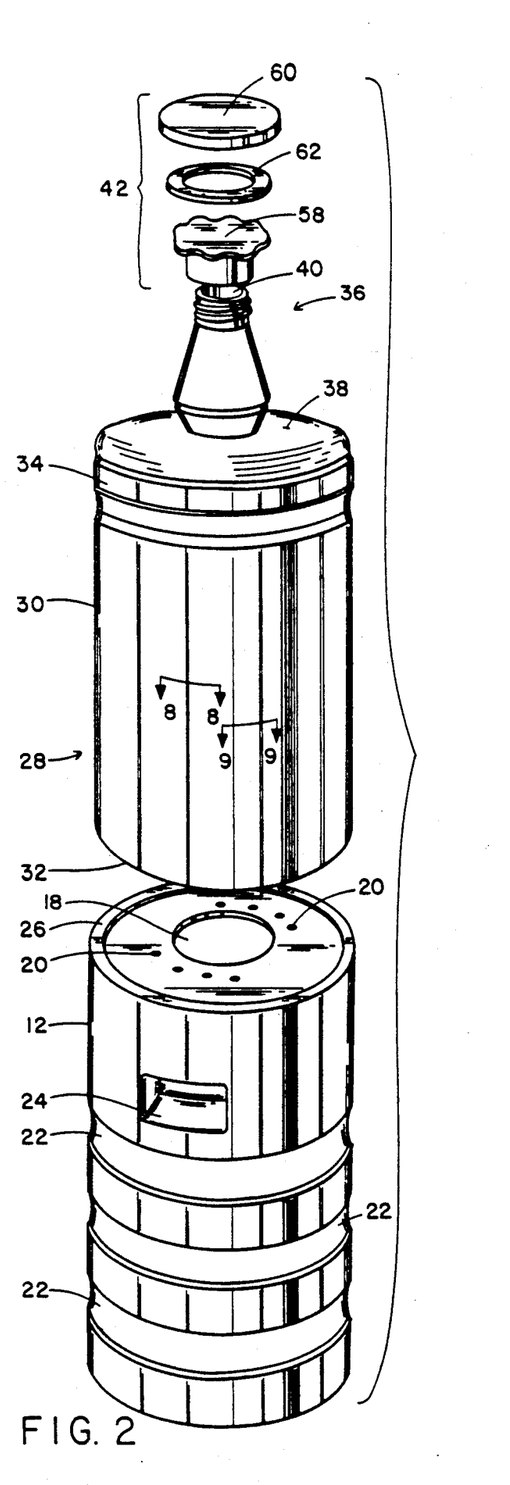
FIG. 2 is an exploded view of the container illustrated in FIG. 1.

Referring now to FIGS. 1 and 2, an outer container 10 includes a peripheral side wall 12, bottom wall 14 and top wall 16. The outer container is preferably made of a relatively rigid but somewhat flexible plastic material, but other suitable material, e.g., metal, may also be employed. The container would typically have a volumetric capacity of five gallons but this invention has applicability to smaller and larger containers as well.

The top wall 16 is provided with a central aperture 18, while a plurality of small vent holes 20, arranged in a circular pattern, may at least partially surround the aperture 18, although any number of vent holes in any number of pattern configurations may be utilized.

The top wall 16 is also preferably formed with a peripheral bead 26 to facilitate vertical stacking as will be explained further herein. The peripheral side wall 12 of the outer container may be formed with a plurality of annular grooves 22 for added rigidity, but here again, other suitable reinforcement configurations may be incorporated into the container wall structure if desired. Diametrically opposed recessed handles 24 (only one of which is shown) may also be formed integrally with the peripheral side wall, to facilitate lifting and carrying of the container.

With particular reference to FIG. 2, a single piece, i.e., unitary, plastic container liner or bladder 28 includes a thin peripheral side wall 30 which is thick enough to be normally self-supporting but thin enough to be collapsible upon exertion of pressure thereon from any direction, e.g., axially, radially, etc. A preferred thickness for the sidewall is about 5 to 10 mil.

A bottom wall 32 is of substantially the same thickness as the peripheral side wall, but may be somewhat thicker if desired. The bottom wall must, however, be thin enough to be collapsible (or foldable) along with the side wall. An upper portion 34 of the sidewall may also be of increased thickness but must also be is collapsible as described below. A neck portion or pour spout 36 is formed integrally with a top wall 38 and extends upwardly away from the top wall, terminating at a discharge orifice 40. The thickness of a radially outward portion of the top wall may be the same as the sidewall 30 or sidewall portion 34 but increases in the area immediately adjacent the pour spout 36 to preferably about 20 mil. This insures that the base of the pour spout and the area of the top wall immediately surrounding the spout will be fairly rigid.

A closure assembly 42 is provided which will be described in detail further herein.

Figure 3:
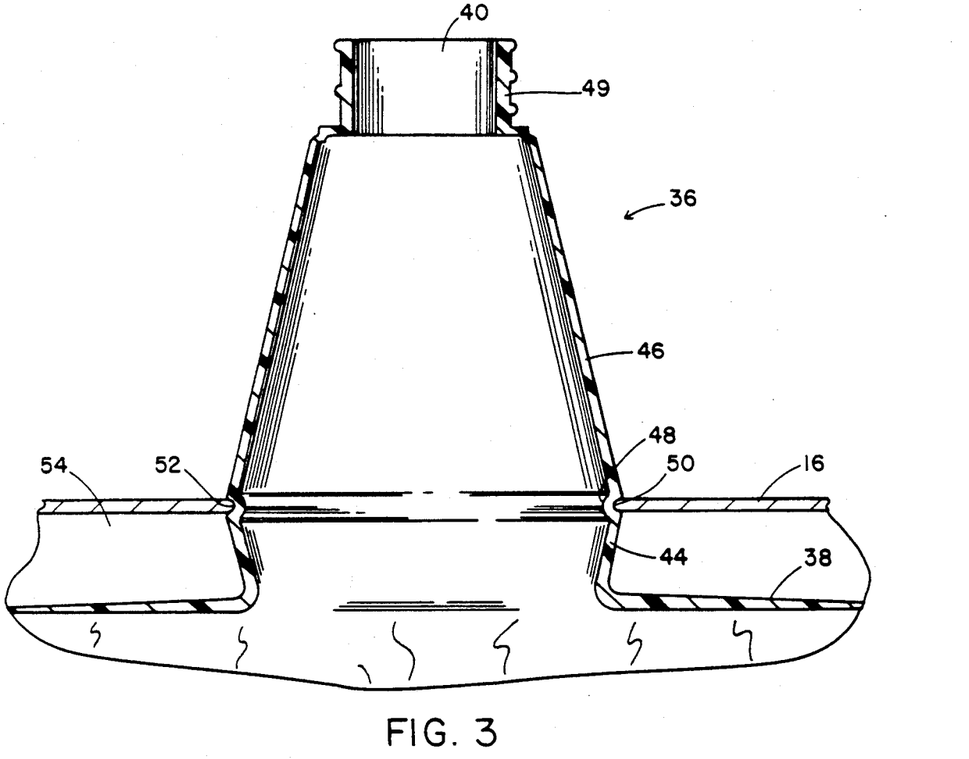
FIGS. 3-7 illustrate the manner in which the pouring spout of the liner illustrated in FIG. 2 may be moved between operative (extended) and inoperative (retracted) positions.

With reference now particularly to FIG. 3, the pour spout 36 will be described. A lower neck portion includes an upwardly divergent peripheral wall 44, and an upper neck portion includes an upwardly convergent peripheral wall 46. As clearly shown in FIG. 3, the lower neck portion wall 44 has an increased thickness relative to the radially outward portion of the top wall 38. This increased thickness extends to an annular, inwardly directed bead 48 which defines an outwardly directed annular groove 50. The upper neck portion wall 46 has a wall thickness which decreases gradually from the bead 48 upwardly to an exteriorly threaded, thickened closure portion 49 which defines the discharge opening 40.

The groove 50 is designed to snap into place about the peripheral edge 52 of the aperture 18 upon insertion of the liner 28 into the outer container 10. In other words, the liner or bladder 28 may be collapsed with concurrent folding of the bottom wall 32 and top wall 38 to the extent necessary to enable the liner to pass through the aperture 18, which may have a diameter about one third the diameter of the outer container. Once the groove 50 is snapped into place within the aperture 18, the composite container is ready for filling, the bladder expanding to its normal, substantially cylindrical shape under the weight of the filling liquid. The liner sidewall 30 and bottom wall 32 will be in substantial engagement with the interior surfaces of side wall 12 and bottom wall 14 of the outer container 10, but a space 54 is established between the respective top walls 16 and 38 so that some expansion of the liner is permitted. In addition, this space provides protection for the liner in the event of impact and/or stress on the top wall 16 as would be experienced, for example, during vertical stacking, shipping, etc.

Figure 4:
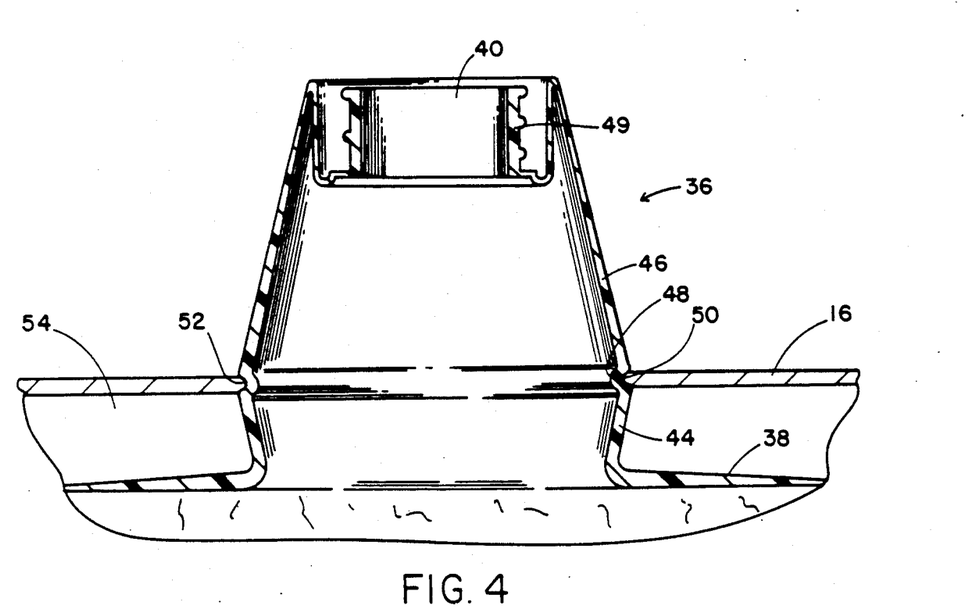
Figure 5:
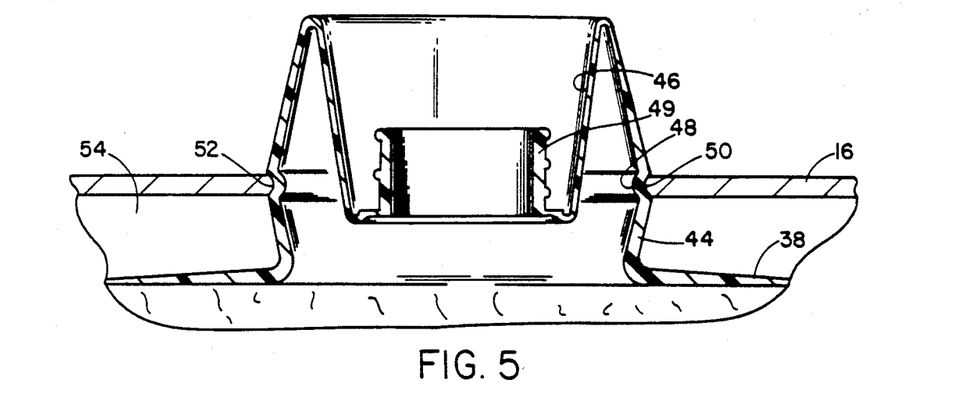
Figure 6:
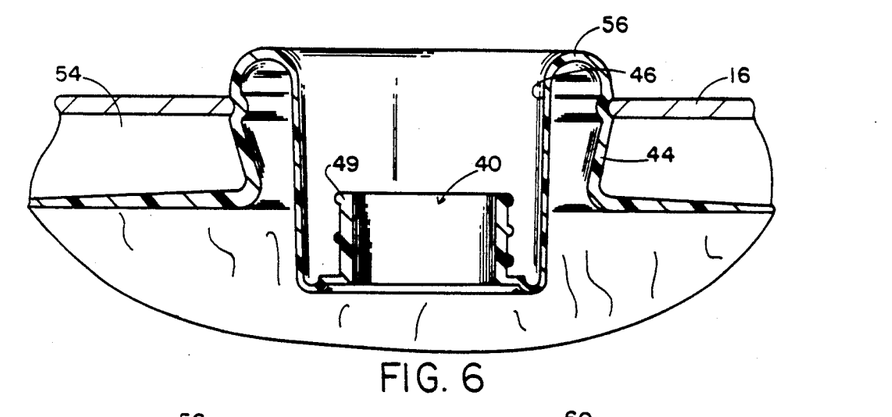

The manner in which the neck portion or spout 36 is collapsible to a position substantially within the outer container 10 is illustrated sequentially in FIGS. 4 through 7. Specifically, the wall thickness of the upper neck portion wall 46 is such that the closure portion 49 may be pressed downwardly, causing the upper neck portion wall 46 to double back on itself, the closure portion 49 remaining in a substantially upright, or operative orientation. This downward pressing of the closure portion 49 may continue until substantially all of the upper neck portion wall 46 and the closure portion 49 lie beneath the aperture 18 as shown in FIG. 6, leaving only an upstanding peripheral "bead" 56 above the top wall 16. During the above described operation, it will be appreciated that the snap fit attachment of the liner 28 to the outer container 10 at the groove 50/edge 52 interface is strong enough to withstand the downward pressure on the upper neck portion wall 46 and closure portion 49 without dislodgement of the liner 28 from the container aperture 18.

Figure 7:
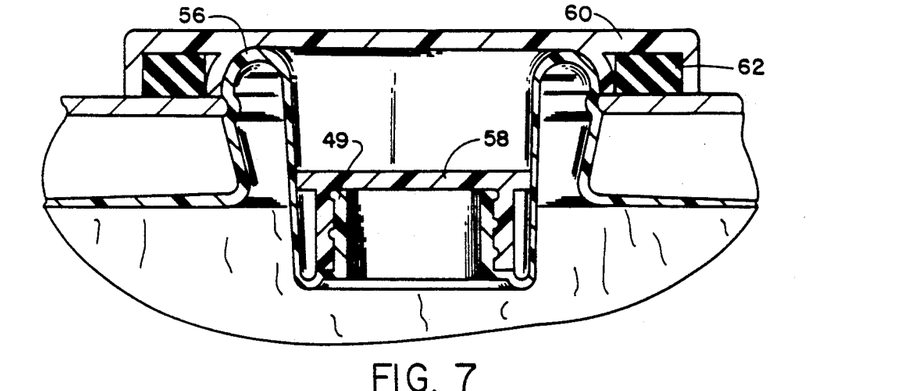

Referring to FIGS. 2 and 7, the closure assembly 42 includes a conventional screw-threaded cap 58 which may be screwed onto the exteriorly threaded closure portion 49 to seal the contents of the liner. Thereafter, a cap 60, which may include a rubber (or other suitable material) gasket 62, may be friction fit over the peripheral bead 56 of the upper neck portion wall 46 which extends above the top wall 16, as best seen in FIG. 7. It will be appreciated, of course, that the screw cap 58 can be applied to the closure portion 48 when the pour spout is in its extended position (FIG. 3) before collapsing to its inoperative or retracted position, or after the relocation of the neck or pour spout 36 to the inoperative position illustrated in FIG. 6.

In any event, with the cap 60 in place, the composite container is ready for shipment, storage, etc., and can be readily stacked by reason of the low profile maintained by the neck or pour spout in its collapsed position. In this regard, the cap 60 does not extend vertically above the upper surface of the peripheral bead 26.

To discharge the contents of the container, the cap 60 is removed and the pour spout 36 is pulled upwardly and out of the outer container 10 to an extended or operative position, i.e., reversing the movement illustrated in FIGS. 4 through 6. Screw cap 58 may then be removed and the container contents discharged.

Figure 8:
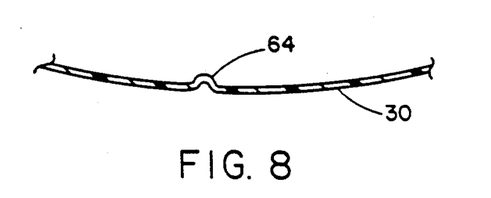
FIGS. 8 and 9 are partial cross sectional view of portions of the peripheral side wall of the inner liner illustrated in FIG. 2.
Figure 9:
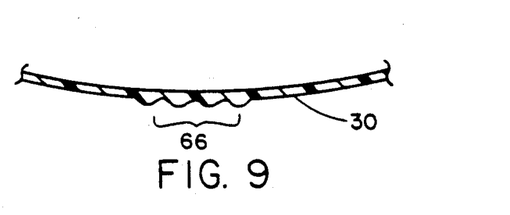

With reference now to FIGS. 2, 8 and 9, one (FIG. 8) or more (FIG. 9) ribs may be integrally formed in the liner in order to add an additional degree of rigidity to the liner 28, while still permitting the liner to collapse to the extent required to insert and/or remove it from the aperture 18 of the outer container 10. In FIG. 8, a single, substantially vertical rib 64 is formed which extends inwardly of the exterior surface of the liner peripheral side wall 30. In FIG. 9, a plurality of adjacent solid ribs 66 also extend vertically along the side wall 30, but extend outwardly therefrom. It will be appreciated, however, that many other rib configurations can be employed to provide the desired rigidity to the liner 28. These ribs, along with upper portion 34 prevent the inner liner from collapsing about the pour spout during pouring, and also serve to insure air flow along the length of the liner to facilitate removal thereof from the outer container body 10.

Figure 10:
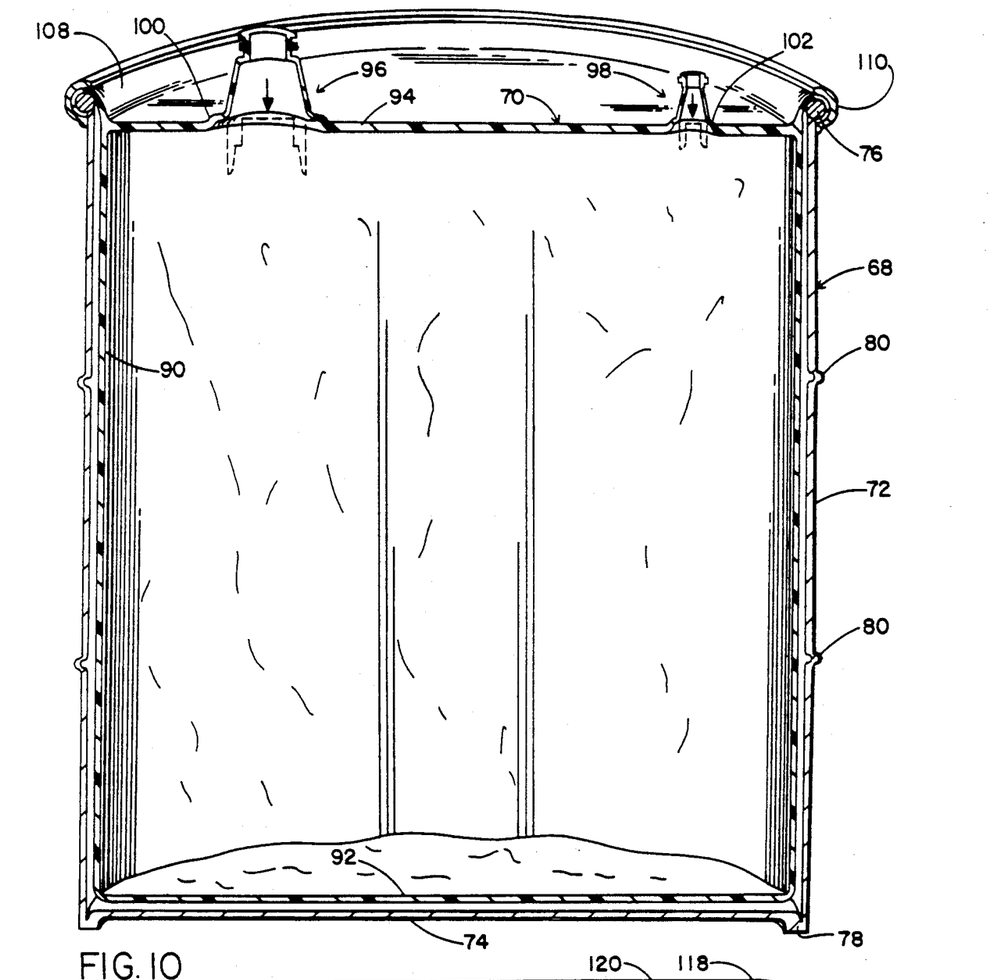
FIG. 10 is a side sectional view of a second exemplary embodiment of the present invention.

FIG. 10 illustrates another embodiment of the invention wherein an outer container 68 supports a unitary liner 70 in the manner described below. The outer container 68 is formed with a peripheral side wall 72, a bottom wall 74 and an enlarged peripheral bead 76 extending about the upper open end of the container 68. An annular support bead 78 extends about the periphery of bottom wall 74, and annular reinforcing rings 80 may be formed in the peripheral side wall 72 if desired.

The unitary liner 70 is formed with a peripheral side wall 90, a bottom wall 92 and a top wall 94. The latter is provided with a collapsible pour spout 96 which is similar to the pour spout 36 of the FIG. 1 embodiment, the structural differences explained below.

The top wall 94 of this embodiment is also provided with a relatively small vent outlet 98 which is similar in structure and operation to the pour spout 96, in terms of its collapsibility, to an inoperative or retracted position. It will be appreciated that both the pour spout 96 and vent outlet 98 are movable between retracted and extended positions substantially in the same manner as previously described with respect to pour spout 36. Since there is no outer container top wall, however, the top wall 94 of the liner is thickened throughout with thickened, raised annular portions 100, 102 to provide the required strength and support for the spout 96 and vent 98, respectively. The spout 96 and vent 98 have upper closure receiving portions 104, 106, respectively, for receiving closure assemblies such as shown at 42 in FIG. 2 or other suitable closures.

The liner 70 is also provided with an integrally formed, flexible mounting flange 108 which extends radially outwardly and upwardly relative to the top wall 94, and which may be fitted over the peripheral bead 76 of the outer container 68. Thereafter, an annular resilient support ring 110 may be friction fit or snapped into place over the bead 76 and flange 108 to thereby sandwich the latter between the bead 76 and ring 110. This arrangement provides adequate support for the liner 70 so as to prevent separation of the liner from the outer container 68 upon moving the pour spout 96 and/or vent outlet 98 between extended and retracted positions.

Figure 11:
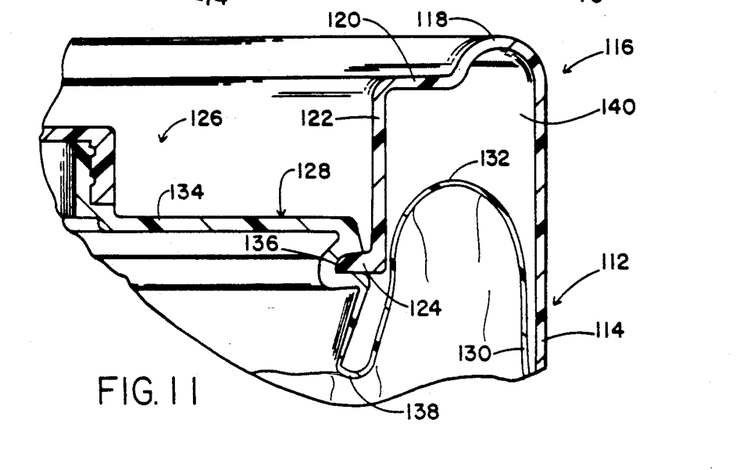
FIG. 11 is a side cross sectional view of a third exemplary embodiment of the invention.

In FIG. 11, another embodiment of the subject invention is shown wherein an outer container 112 includes a peripheral side wall 114, a bottom wall (not shown), and an enlarged, peripheral bead 116 extending about the upper open end of the container.

The bead 116 includes an outermost upwardly projecting portion 118, an adjacent, radially inwardly directed horizontal surface 120 and a depending annular skirt portion 122 which terminates in a radially inwardly directed flange 124, defining an access opening 126.

The liner 128 includes a relatively thin peripheral side wall 130 which merges into a thin top wall portion 132. A substantially thicker and radially centered top wall portion 134 includes a radially outward facing groove 136 which is adapted to be snap-fit about the inwardly directed, annular flange 124. Upon insertion of the liner 128 into the container 112 via access opening 126, excess top wall material of the liner 128 is free to form a fold 138 and extend up into a space 140 created by the side wall 114 and depending skirt 122.

The top wall 134 of the liner 128 is provided with an upstanding spout 142, exteriorly threaded for receiving a conventional screw cap 144. The spout in this embodiment is not movable between extended and retracted positions as in the previously described embodiments, since the spout lies within a recess formed by the depending skirt 122 of the outer container 112. In other words, since the spout lies beneath the enlarged annular bead 116, it does not interfere with vertical stacking where the bottom wall of another outer container would rest on surface 120 and bead 118.

Figures 12, 13:
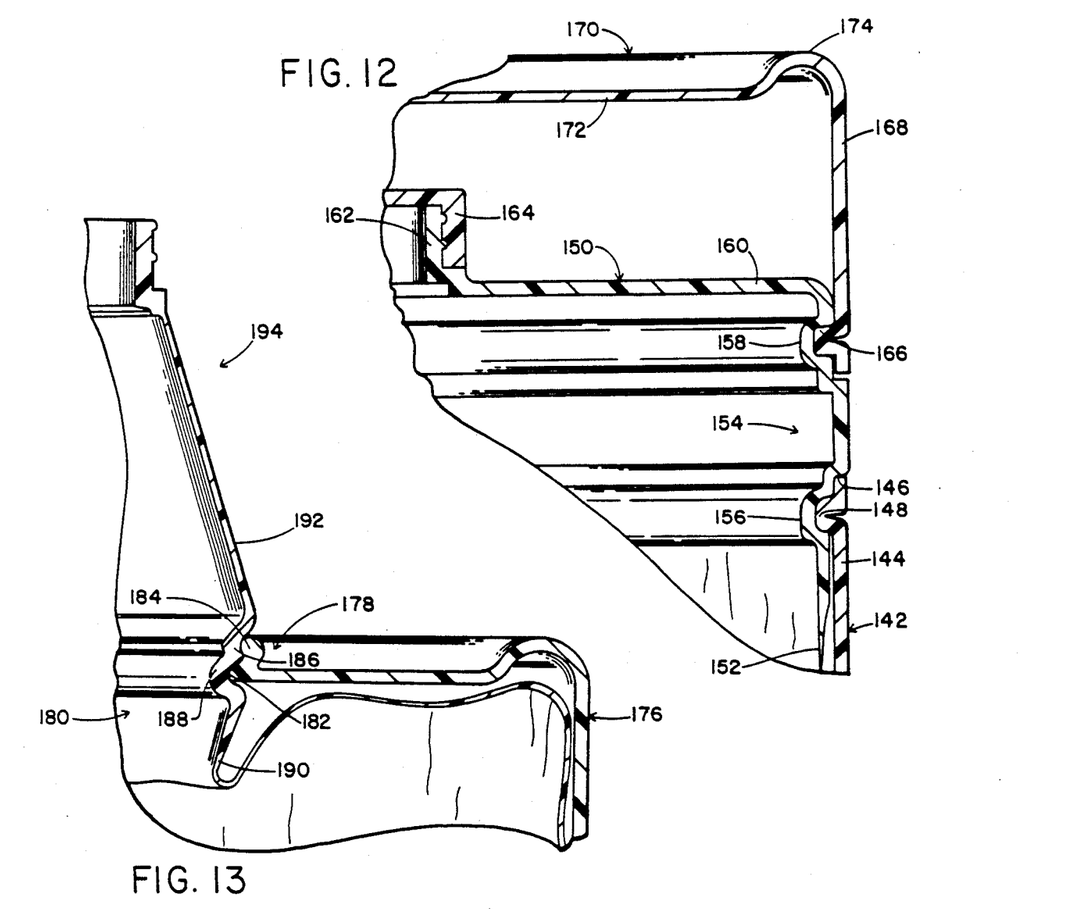
FIG. 12 is a cross sectional side view of a fourth exemplary embodiment of the invention.
FIG. 13 is a side cross sectional view of a fifth embodiment of the invention.

Turning now to FIG. 12, another variation of the invention includes an outer container 142 having a peripheral side wall 144 and a bottom wall (not shown), the side wall terminating at an upper open end defined by a free edge 146. An inwardly directed peripheral bead 148 is provided adjacent the edge 146.

A liner 150 includes a thin peripheral side wall 152 which is thickened in an upper portion 154. This thickened upper portion of the side wall is formed with a first outwardly facing annular groove 156, and a second, axially spaced annular groove 158. A thickened top wall 160 is provided with an upstanding pour spout 162, exteriorly threaded to receive a conventional screw cap 164.

The first groove 156 is adapted to engage or receive the bead 148 to thereby secure the liner 150 within the outer container 142. The second annular groove 158 is provided to cooperate with an inwardly directed annular bead 166 formed at the lower end of a depending skirt 168 of a protective cover or cap 170.

In this embodiment, the thickened pour spout 162, which is not of the pop-up type, is completely enclosed by the cap 170. In this way, the removable cap 170 protects the spout 162 and also facilitates vertical stacking by reason of a flat top surface 172 and surrounding upstanding lip or bead 174.

In FIG. 13, another embodiment of the invention is disclosed, wherein an outer container 176, which may be otherwise similar to container 10 in FIG. 1, is formed with a raised or upstanding lip 178 about a centrally located aperture 180. The upstanding lip 178 is generally Z-shaped with a radially inwardly directed bead 182 and free edge 184 which are designed to releasably engage a pair of annular grooves or notches 186 and 188, respectively, formed in the thickened intermediate area between a lower neck wall portion 190 and an upper neck wall portion 192 of a spout 194.

The manner in which the spout 194 is movable into and out of the outer container 176 is substantially as described hereinabove with respect to the embodiment illustrated in FIGS. 1–7. In this embodiment, the liner side wall 196 and top wall 198 are extended to increase the volumetric capacity of the liner by, in effect, eliminating the space 154 shown in FIG. 3. Thus, the top wall is enabled to extend upwardly about a fold 200 so that the liner substantially fills the entire interior of the container 176.

Figure 14:
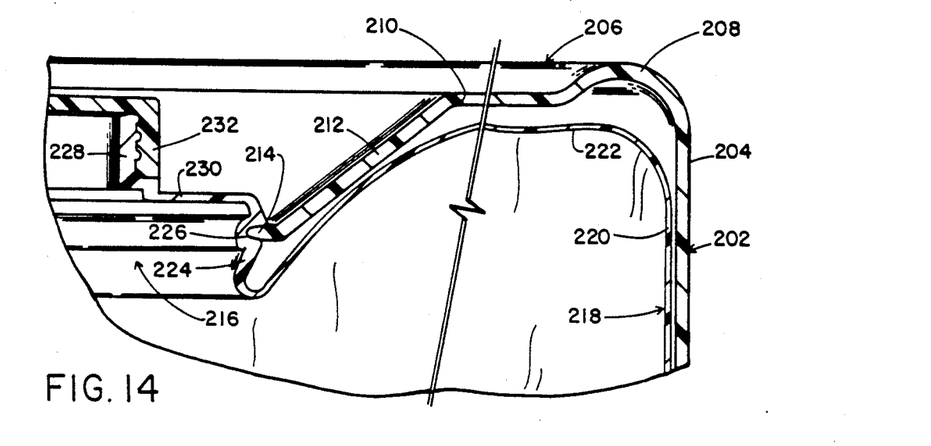
FIG. 14 is a partial side sectional view of a sixth exemplary embodiment of the invention.

Referring now to FIG. 14, another embodiment of the invention includes an outer container 202 having a peripheral side wall 204 and a top wall 206. The top wall is formed with an upwardly projecting annular bead 208 and a radially inwardly adjacent flat surface 210. The latter surface merges with a downwardly and inwardly conical surface 210 which terminates at a circular edge 214 which defines an aperture 216.

An inner liner or bladder 218 includes a peripheral side wall 220 and a top wall 222. A radially centered upstanding wall 224 is formed with a radially outwardly facing, annular groove 226. A thickened upstanding neck 228 is also provided, and is connected to the upstanding wall 224 via a flat, annular surface 230. The neck 228 is provided with an exteriorly threaded surface for receiving a conventional screw cap 232, or other suitable closure.

The inner liner 218 is detachably securable within the outer container 202 by reason of a snap-fit engagement of edge 214 within the groove 226. The conical surface 212 has the effect of locating the neck 228 and cap 232 below the peripheral bead 208 and flat surface 210. This arrangement permits vertical stacking without requiring a collapsible pouring spout construction of the type shown in FIG. 1.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A composite container assembly comprising:
a relatively rigid, unitary outer container body having at least a first peripheral side wall, a first bottom wall and a first top wall having an aperture formed therein;
a flexible and collapsible inner liner having a second peripheral sidewall, a second bottom wall and a second top wall, said top wall having an integral relatively rigid pour spout formed therein, wherein said inner container is nested within said outer container so that at least substantially all of said second peripheral side and bottom walls are in engagement with and supported by said outer container; said pour spout and at least a portion of the second top wall having a wall thickness greater than a wall thickness of said second peripheral side wall; and said outer container and said pour spout of said inner liner having cooperable surfaces for releasably securing said liner within said outer container body; and wherein
said second peripheral side, bottom and top walls are sufficiently flexible to permit insertion and removal of said liner into and out of said outer container body through said aperture in said first top wall.

2. A composite container assembly according to claim 1 wherein said cooperable surfaces include an annular edge of said container body top wall defining said aperture, and an annular groove provided in said pour spout.

3. A composite container assembly according to claim 2 wherein said aperture has a diameter about one third the diameter of the liner.

4. A container assembly according to claim 1 wherein said flexible liner has a wall thickness in at least a major portion of said second peripheral sidewall of about 5 to about 10 mil.

5. A container assembly according to claim 2 wherein said pour spout has an upper portion terminating in a discharge port, said upper portion having a peripheral surface located above said annular groove which is sufficiently flexible to permit said upper portion to collapse downwardly under pressure into said outer container so that said discharge port is located below said first top wall in a retracted position.

6. A container assembly according to claim 5 wherein said pouring spout is provided with an external screw thread adjacent said discharge port for threadably receiving a first removable cap.

7. A container assembly according to claim 1 wherein said pour spout includes an upwardly extending and inwardly tapering wall portion terminating at an upper discharge port, and a lower, relatively rigid peripheral base portion, said upwardly extending and inwardly tapering wall portion separated from said lower base portion by an annular groove.

8. A container assembly according to claim 5 and including a second cap removably securable to said pour spout, and wherein in the retracted position, said second cap lies vertically spaced above said first cap and engages the first top wall of the outer container.

9. A container assembly according to claim 5 and wherein during movement to said retracted position, said upper portion of said pour spout, with the exception of said discharge port, is rolled downwardly and back on itself to a substantially inside-out configuration.

10. A container assembly as defined in claim 1 wherein said second peripheral sidewall has a wall thickness sufficient to enable said collapsible inner liner to be normally self-supporting.

11. A container assembly as defined in claim 1 wherein said second bottom wall has a thickness at least equal to said second peripheral sidewall.

12. A container assembly as defined in claim 1 wherein said second bottom wall has a thickness greater than said second peripheral sidewall.

13. A composite container assembly according to claim 1 wherein said outer container body is provided with a top wall including an enlarged peripheral bead and a depending skirt portion defining an aperture, and wherein said cooperable surfaces include a radially inwardly directed edge extending from said depending skirt and an annular groove formed in a thickened portion of said liner top wall.

14. A composite container assembly according to claim 13 wherein said pour spout extends upwardly from said liner top wall but does not extend above said enlarged peripheral bead.

15. A composite container assembly according to claim 13 wherein said inner liner extends into an area of said outer container body between said first peripheral side wall and said depending skirt.

16. A composite container assembly as defined in claim 1 wherein said cooperable surfaces include at least one radially inwardly directed annular bead formed in said first peripheral sidewall and at least one radially outwardly facing groove formed in a thickened upper portion of said second peripheral side wall.

17. A composite container assembly as defined in claim 16 wherein said second peripheral side wall is provided with a second radially outwardly facing groove spaced vertically above said one radially outwardly facing groove, and wherein said composite container assembly further includes a first cap engageable with said pour spout and a second cap having a top surface vertically spaced from said first cap, and a peripheral depending skirt having a radially inwardly directed bead engageable with said second groove.

18. A composite container assembly as defined in claim 2 wherein said annular edge of said container body top wall defining said aperture includes a raised lip having a pair of radially inwardly directed annular projections, and said pour spout is formed with a complementary pair of radially outwardly facing annular grooves.

19. A composite container assembly as defined in claim 2 wherein said container body top wall has a radially inwardly and downwardly directed conical surface terminating in a radially inwardly directed edge, said cooperable surfaces including said edge and a groove formed in an upstanding portion of said liner top wall, and wherein said pour spout lies within a recessed area defined by said conical surface.

20. A composite container assembly as defined in claim 1 wherein said liner top wall is provided with a collapsible pour spout and a collapsible vent spout.

21. A composite container assembly as defined in claim 1 wherein said first peripheral side wall of said outer container body terminates at an upper end thereof in an enlarged peripheral bead; and said liner is provided with a flexible, radially outwardly directed mounting flange adapted to be supported on said bead; said composite container assembly further comprising means for securing said mounting flange to said bead.

22. A composite container assembly as defined in claim 21 wherein said securing means includes a resilient circular ring adapted to be friction fit over said mounting flange to thereby clamp said flange between said ring and said bead.

23. A composite container assembly according to claim 1 wherein said liner is constructed of a low density plastic material and wherein at least a substantial portion of said peripheral side wall has a thickness of between 5 and about 10 mil.

24. A container assembly comprising:
a relatively rigid outer container body having a first peripheral side wall, a first bottom wall, and a first top wall, the first top wall having an aperture formed therein;
a flexible inner container liner including a second peripheral side wall, a second bottom wall, and a second top wall;
wherein said second peripheral side, bottom and top walls are sufficiently flexible to permit insertion of said second inner container liner into said outer container body through the aperture in the first top wall, such that said first peripheral side wall and said first bottom wall provide substantially full surface support for said second peripheral side wall and second bottom wall;
a pour spout formed integrally with said second top wall movable between an extended position where said spout extends above said first top wall and a retracted position wherein said spout lies substantially below said first top wall; and
means provided on said pour spout for releasably attaching said pour spout within said aperture.

25. A container assembly according to claim 24 wherein said aperture in said first top wall is circular and has a diameter about one third the diameter of the outer container body.

26. A container assembly according to claim 24 wherein said means for releasably attaching said pouring spout within said aperture comprises a peripheral groove extending about said pouring spout and adapted to snap into engagement with an edge of said first top wall which defines said aperture.

27. A container assembly according to claim 24 wherein said flexible inner container and pouring spout are of unitary construction.

28. A container assembly according to claim 24 wherein said pour spout means is provided with a means for receiving a removable cap.

29. A container assembly according to claim 24 wherein said pour spout means includes an upwardly extending and inwardly tapering peripheral wall portion terminating at an upper closure receiving portion, said peripheral wall portion having a thickness tapering upwardly from about 20 mil to about 10 mil and said closure receiving portion having a thickness of about 20 mil.

30. A container assembly according to claim 24 wherein said outer container body is provided with handle means.

31. A container assembly according to claim 30 wherein said liner is provided with one or more ribs extending axially along said second peripheral side wall.

32. A container assembly according to claim 31 wherein said outer container body is provided with a plurality of vent holes.

33. A container assembly according to claim 32 and including a cap removably securable to said pouring spout, and wherein in the retracted position, said cap lies within said aperture and beneath said first top wall.

34. A container assembly according to claim 24 and wherein said pour spout means includes a tapered wall portion of varying thickness, and wherein during movement between said extended and retracted positions, said tapered wall portion is rolled downwardly and back on itself to a substantially inside-out configuration.

35. A container assembly as defined in claim 24 wherein said second peripheral sidewall has a wall thickness sufficient to enable said flexible inner container liner to be normally self-supporting.

36. A container assembly as defined in claim 24 wherein said second bottom wall has a thickness at least equal to said second peripheral sidewall.

37. A container assembly as defined in claim 24 wherein said second bottom wall has a thickness greater than said second peripheral sidewall.

38. A container assembly as defined in claim 24 wherein said relatively rigid outer container body and said flexible inner container liner are plastic.

* * * * *